Feb. 14, 1939.    L. RICEFIELD    2,146,765
COUPLING
Filed Dec. 21, 1936    2 Sheets-Sheet 1
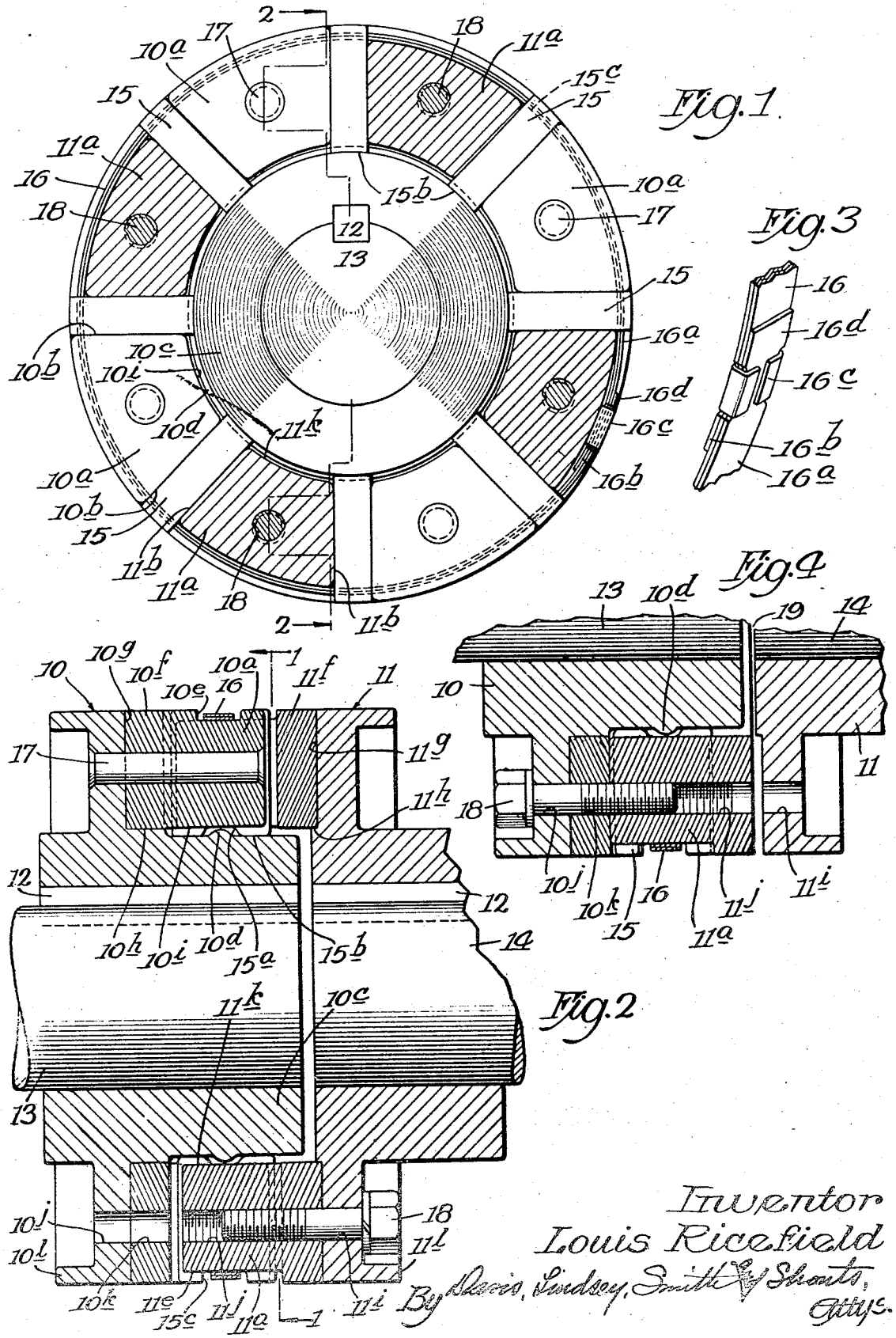
Inventor
Louis Ricefield
By Davis, Lindsey, Smith & Shonts,
Attys.

Feb. 14, 1939. L. RICEFIELD 2,146,765
COUPLING
Filed Dec. 21, 1936 2 Sheets-Sheet 2

Inventor:
Louis Ricefield
By Davis, Lindsey, Smith & Shonts, Attys

Patented Feb. 14, 1939

2,146,765

UNITED STATES PATENT OFFICE 2,146,765

COUPLING

Louis Ricefield, Oak Park, Ill.

Application December 21, 1936, Serial No. 116,846

6 Claims. (Cl. 64—14)

This invention relates to improvements in couplings and its purpose is to provide an improved device by which two substantially aligned shafts may be connected to compensate for relative lateral displacement and angularity of the shafts and to permit relative endwise movement thereof during their rotation. The present invention is an improvement upon the type of coupling disclosed in my prior United States Patent No. 2,025,827, dated December 31, 1935, in which a pair of metallic coupling members adapted to be secured upon two substantially aligned shafts, are provided with longitudinally extending jaws adapted to intermesh loosely with each other and to receive between them a plurality of separate power transmitting members, formed preferably of deformable, resilient material, which are held against radial outward movement by an annular retaining member which may be removable, as disclosed in my copending application Ser. No. 80,940, to permit removal of one or more of the power transmitting members without displacing the coupling members from their normal positions on the shafts.

The principal object of the present invention is to provide an improved coupling of the type referred to above in which the longitudinally extending jaws carried by one of the coupling members are detachable and capable of being supported independently of the body portion of that coupling member in order to permit relative transverse movement of the coupling members and their shafts without the necessity of moving either coupling member longitudinally of its shaft. A further object of the invention is to provide an improved coupling of this type comprising improved means for centering the two coupling members with respect to each other and for supporting the intermediate power transmitting members against radial inward movement. A further object of the invention is to provide an improved coupling comprising a plurality of coupling members each having a plurality of longitudinal extending jaws intermeshing loosely with the jaws carried by the other coupling member, in which the jaws carried by one or both of the coupling members are carried by an annular member which is detachable from the body portion of the coupling member. Still another object of the invention is to provide an improved coupling of the type referred to in which the jaws carried by one coupling member are formed upon a detachable ring which may be removed from the body portion of the coupling of which it forms a part and temporarily secured to the other coupling member, without disturbing the intermediate power transmitting members or the annular means by which these power transmitting members are retained against radial outward displacement, when it is desired to effect relative radial displacement of one of the shafts and its coupling member with respect to the other shaft and the body portion of the coupling member from which the detachable ring has been removed. Other objects relate to other features of construction and arrangement which will appear more fully hereinafter.

The nature of the invention will be understood from the following specification taken with the accompanying drawings in which two embodiments are illustrated. In the drawings:

Fig. 1 shows a radial transverse section through one form of coupling embodying the present invention, the section being taken on the line 1—1 of Fig. 2;

Fig. 2 shows a longitudinal section taken on the line 2—2 of Fig. 1;

Fig. 3 shows a partial plan view of one side of the coupling illustrating the joint by which the ends of the surrounding retaining ring or strap are secured together;

Fig. 4 shows a partial sectional view similar to that of Fig. 2 illustrating the relative positions of the parts after the detachable ring carrying one series of jaws has been removed from the body portion of one coupling member and temporarily attached to the other coupling member;

Figure 5:
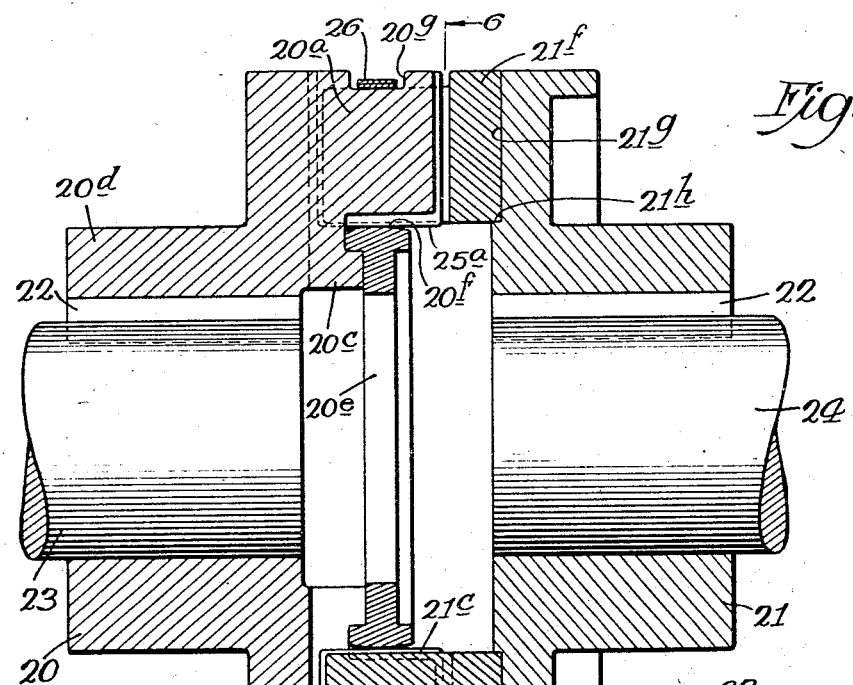
Fig. 5 is a sectional view similar to that of Fig. 2 showing a modified form of coupling embodying the features of the present invention.
Figure 7:
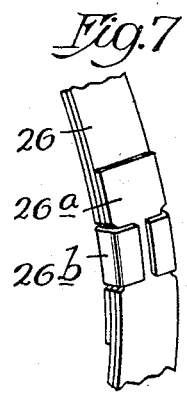
Figure 8:
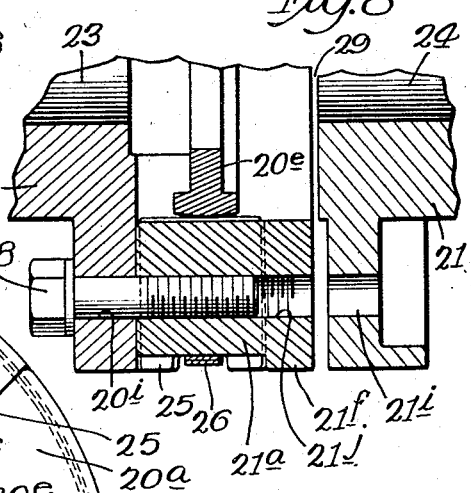

Fig. 7 is a partial plan view of one side of the coupling illustrated in Fig. 5 showing the means for connecting the overlapping ends of the strap which constitutes the annular retaining member; and Fig. 8 is a partial sectional view similar to that of Fig. 5 showing the relative position of the parts after the detachable ring carrying the jaws of one coupling member has been removed from the body portion of that coupling member and temporarily attached to the other coupling member.

As illustrated in Figs. 1 to 4, inclusive, of the drawings, the invention is embodied in a coupling comprising a pair of coupling members 10 and 11 which are detachably secured by means of keys 12 upon a pair of substantially aligned shafts 13 and 14, respectively. The coupling member 10 is provided with a plurality of longitudinally extending jaws 10ᵃ which are adapted to extend between and intermesh loosely with a plurality of corresponding jaws 11ᵃ which are carried by the other coupling member 11. Each jaw 10ᵃ is provided with opposite faces 10ᵇ each of which is located opposite to one of the corresponding faces 11ᵇ which are formed on opposite sides of each of the jaws 11ᵃ. In the present embodiment, each face 10ᵇ is parallel to and adjacent an oppositely disposed face 11ᵇ and the faces of each pair are adapted to co-act with opposite sides of an intermediate power transmitting member 15. There are eight of these separate power transmitting members in the form of construction illustrated in the drawings and they are preferably formed of resilient, deformable material having great wear-resisting qualities, such as rubber, rubberized fabric, or leather.

For the purpose of preventing radial inward displacement of the power transmitting members 15, one of the coupling members 10 is provided with an elongated hub portion 10ᶜ which extends longitudinally toward the face of the other coupling member 11. The outer peripheral surface of this hub portion 10ᶜ is adapted to co-act with the inner ends of the power transmitting members 15 and, in order to permit the centering of one coupling member with respect to the other and to limit the relative lateral displacement of the two coupling members, during assembly and after continued use, the hub portion 10ᶜ of the coupling member 10 is preferably provided on its outer surface with an annular integrally formed rib 10ᵈ which is semi-circular in cross section and which has its outer curved surface separated slightly from the inner curved faces of the jaws 11ᵃ carried by the coupling member 11. The power transmitting members 15 are provided with grooves 15ᵃ in their inner surfaces to receive the rib 10ᵈ formed on the hub portion 10ᶜ so that the end faces 15ᵇ of the power transmitting members 15, at opposite sides of the grooves 15ᵃ, will rest upon the outer surface of the hub portion 10ᶜ. In order to prevent radial outward displacement of the members 15, these members are provided on their outer ends with grooves 15ᶜ which align with each other circumferentially of the coupling and which are also adapted to align with grooves 10ᵉ formed in the jaws 10ᵃ, thus forming a channel which is adapted to receive an annular retaining member 16, formed preferably as a plurality of superimposed layers 16ᵃ of a spiral winding of a steel strap or the like which has its ends overlapped as shown at 16ᵇ, the inner end being secured to a plate 16ᶜ which has its projecting arms bent outwardly and over the outer end 16ᵈ of the strap, as shown in Figs. 1 and 3, so that the overlapping ends are retained against relative radial displacement. The frictional resistance between adjacent superimposed layers of the retaining ring 16 is sufficient to prevent separation of the overlapping ends or the enlargement of the ring under the influence of radial stresses which are imparted to the ring during the operation of the coupling. The ring 16 is preferably of lesser width than the grooves 15ᶜ and 10ᵉ in order to permit some movement of the members 15 and 16 longitudinally of the shafts with respect to the coupling member 10 and similar relative longitudinal movement is permitted with respect to the coupling member 11 by reason of the fact that the outer faces 11ᵉ of the jaws 11ᵃ are offset inwardly, as shown in Fig. 2, so that they may slide freely beneath the inner surface of the ring 16.

In order to permit machining of the faces 10ᵇ of the jaws 10ᵃ, and also the outer circumferential surface of the hub portion 10ᶜ, the jaws 10ᵃ are preferably formed as integral parts of a detachable ring 10ᶠ which, after the machining has been completed, is secured to the body portion of the coupling 10 by means of rivets 17 which extend through aligning apertures formed in the ring and in the radial disk of the coupling member against which the ring seats on annular surfaces 10ᵍ and 10ʰ. These apertures which are engaged by the rivets 17 preferably extend through the jaws 10ᵃ and when the detachable ring 10ᶠ has thus been secured to the body portion of the coupling member 10, the inner faces 10ⁱ thereof are displaced slightly from the outer face of the hub portion 10ᶜ and a lesser distance from the outer portion of the rib 10ᵈ. Instead of using rivets, studs or other fastening means may be used to permit the ring 10ᶠ to be readily detachable from the body of the coupling which may be desirable, for example, when it is necessary to rotate either of the shafts independently of the other without disturbing the relative relationship of the intermeshing jaws and the intermediate power transmitting members or the means by which these members are retained in place.

For the purpose of permitting relative lateral separation of the two coupling members and their shafts, without the necessity of moving either coupling member longitudinally of its shaft, the jaws 11ᵃ, carried by the coupling member 11, are formed preferably as integral parts of a detachable ring 11ᶠ which seats against an annular surface 11ᵍ on the radial disk of the coupling member 11 and against an annular shoulder 11ʰ which is formed at the inner margin of this surface 11ᵍ. The detachable ring 11ᶠ is normally detachably secured to the body portion of the coupling member 11 by a series of studs 18 which extend through apertures 11ⁱ formed in the radial disk of the coupling member and which engage threaded apertures 11ʲ extending through the detachable ring 11ᶠ and through the jaws 11ᵃ which form parts thereof. When the ring 11ᶠ is thus secured to the body portion of the coupling member 11 by the studs 18, as shown in Fig. 2, the inner surfaces 11ᵏ of the jaws 11ᵃ are displaced slightly from the outer surface of the annular rib 10ᵈ. An annular flange 11ˡ is formed at the outer edge of the radial disk of the coupling member 11 to extend longitudinally over the heads of the studs 18 to prevent accidental contact of these heads with surrounding objects during the rotation of the coupling, and a similar flange 10ˡ is formed at the outer margin of the radial disk of the coupling member 10. When it is desired to effect relative radial displacement of the two shafts and the coupling members carried thereby, the studs 18 are removed from the positions illustrated in Fig. 2 and are inserted through apertures 10ʲ and 10ᵏ, which are formed in the radial disk and in the detachable ring 10ᶠ of the coupling member 10, respectively, and are threaded into the apertures 11ʲ in the jaws 11ᵃ in reversed positions as shown in Fig. 4, thus drawing the ring 11ᶠ away from the body portion of the coupling 11 until the end faces of the jaws 11ᵃ seat against the ring 10ᶠ between the jaws 10ᵃ. When that condition has been brought about, the face of the detachable ring 11ᶠ, which has previously been seated against the surface 11g of the coupling member 11, will be removed from the body portion of the coupling member 11 to a sufficient extent to provide a clearance 19, as shown in Fig. 4, sufficient to permit the shaft 13 and the coupling parts carried thereby to be moved transversely with respect to the shaft 14 and the body portion of the coupling 11 which remains in its original position thereon. After the desired relative movement has been made and repairs or the like have been effected, the shaft 13 may be restored to its original position and the studs 18 may be replaced in the positions shown in Fig. 2, whereupon the coupling will again be in condition for operation.

The annular rib 10d which is adapted to limit relative lateral movement of the two coupling members, due to its proximity to the jaws 11a carried by the coupling member 11, is also adapted to serve as a bearing about which the two coupling members may rock upon each other in compensating for relative angularity of the two connected shafts. For this purpose, the rib 10d is preferably located in a plane bisecting the power transmitting members 15, thus limiting the wear upon the surfaces of the jaws and of the power transmitting members due to the relative rocking movements of the coupling members during their rotation. The rib 10d may be otherwise located depending upon the use to which the coupling is to be put; for example, it may be located at the end of the hub portion 10c within the ring 11f carried by the other coupling member so that the outer margin of the rib will be continuously surrounded by the ring 11f which is adapted to rock thereon. This latter arrangement is adapted to limit the wear upon the metal surfaces which engage each other during the relative rocking movement but is adapted to cause increased wear on the surfaces of the jaws and the co-acting power transmitting members which then tend to have greater relative sliding movements during the relative rocking of the rotating coupling members.

In Figs. 5, 6, 7, and 8 of the drawings, there is illustrated a modified form of the invention which differs primarily from that heretofore described in that one series of jaws are formed integrally with the body portion of one coupling member and a detachable hub portion is provided which is welded or otherwise secured to the body portion of the coupling member after the machining of the jaws and the adjacent parts has been effected. In this embodiment, a pair of coupling members 20 and 21 are secured by means of keys 22 upon a pair of substantially aligned shafts 23 and 24, respectively. The coupling member 20 is provided with a radial disk having formed integrally therewith a plurality of longitudinally extending jaws 20a which are adapted to intermesh loosely with a plurality of similar jaws 21a which are carried by the other coupling member 21. Each jaw 20a is provided with opposite faces 20b each of which is spaced from one of the corresponding faces 21b which are formed on opposite sides of each jaw 21a. Each pair of jaw faces 20b and 21b are adapted to receive between them one of a series of power transmitting members 25 which, as in the embodiment of the invention heretofore described, are formed preferably of deformable, resilient material such as rubber, rubberized fabric, or leather. In this embodiment the opposite faces of each member 25 which co-act with corresponding faces 20b and 21b of two adjacent jaws carried by opposite coupling members, are parallel to each other so that the members 25 are subjected to compressive stresses only when forces are transmitted from one coupling member to the other.

In this embodiment, the coupling member 20 has projections 20c which extend only to a limited extent from the hub toward the opposite coupling member 11 inwardly of each jaw 20a and, in order to obtain adequate bearing of the coupling member 20 upon its shaft 23, there is provided a hub portion 20d which extends to a considerable distance longitudinally of the shaft from the lateral disk portion of the coupling member. The projections 20c which extend toward the coupling member 11 are of such limited extent that the faces 20b of the jaws 20a may be machined, even though the jaws 20a are formed integrally with the body portion of the coupling member and, after this machining has been completed, an auxiliary hub portion or ring 20e is secured in place against the projections 20c, preferably by welding or the like. This hub ring 20e has an outer surface 20f which is curved transversely to coact with the inner faces 25a of the power transmitting members 25 and this curved face 20f of the auxiliary hub ring is spaced slightly from the inner faces 21c of the jaws 21a so that it serves to center the coupling member 21 and its shaft with respect to the coupling member 20 while at the same time limiting the possible relative lateral displacement of the two shafts. The hub ring 20e thus serves as a centering device and also as a means for preventing radial inward movement of the separate power transmitting members 25.

Figure 6:
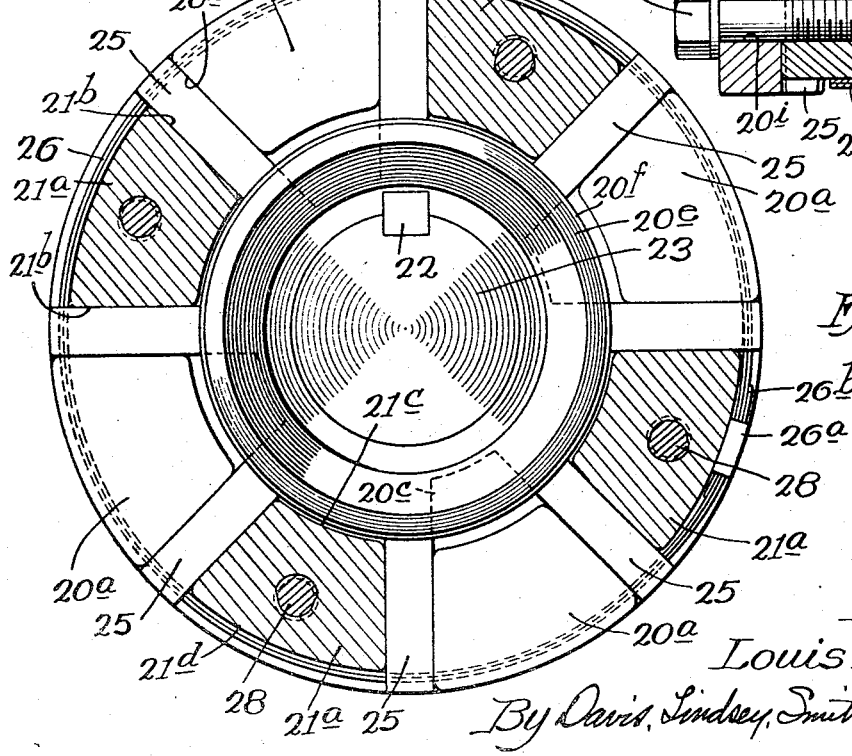
Fig. 6 is a transverse sectional view taken on the line 6—6 of Fig. 5.

The outer ends of the power transmitting members 25 are provided with notches 25b which align with each other circumferentially of the coupling and which are also adapted to align with notches 20g formed in the jaws 20a so that the series of aligned notches are capable of receiving the annular retaining member 26 which comprises a plurality of superimposed layers of steel strapping or the like which is wound in spiral fashion around the coupling with its ends overlapped as shown in Fig. 6. A plate 26a is attached to the inner end of this strap and the arms of this plate are bent outwardly and over the outer end 26b of the strap thus holding the overlapping ends together. The jaws 21a carried by the other coupling member are recessed on their outer sides as shown at 21d so that these jaws extend within the annular retaining member 26 and preferably slightly out of contact therewith so that the two coupling members are capable of relative angular movement without exerting any substantial strain upon the retaining member. The notches in the jaws 20a and in the power transmitting members 25 are preferably of greater width than the member 26 so that some relative longitudinal movement of these parts is permitted.

The jaws 21a carried by the coupling member 21 are formed integrally with a detachable ring 21f which seats against an annular face 21g of the coupling member and against the annular shoulder 21h which is formed at the inner margin of this surface. The ring 21f and its jaws 21a are held in place by a series of cap screws 28 which pass through apertures 21i formed in the radial disk of the coupling member and threadedly engage the threaded apertures 21j which are formed through the jaws 21a and through the ring 21f. When it is desired to effect a relative transverse movement of the two coupling members 20 and 21, without moving either coupling member longitudinally of its shaft, the studs 28 are withdrawn from the apertures 21¹ and 21ʲ and are inserted in reverse position through the apertures 20¹ which are formed in the radial disk of the coupling member 20. These studs 28 may then be threaded into the apertures 21ʲ in their reverse positions to cause the jaws 21ᵃ to be drawn tightly against the face of the coupling member 20, as shown in Fig. 8. The parts are then in such relative positions that a clearance 29 will be provided between the face of the ring 21¹ and the end of the body portion of the coupling member by which that ring is normally carried, thus permitting relative transverse movement of the shaft 23 and the parts carried thereby with respect to the shaft 24 and the parts carried thereby.

Although two forms of the invention have been shown and described by way of illustration, it will be understood that the invention may be constructed in various other embodiments which come within the scope of the appended claims.

I claim:

1. The combination in a coupling for connecting two substantially aligned shafts, of a pair of coupling members each adapted to be secured on a separate one of said shafts, one of said coupling members having a plurality of longtudinally extending jaws, a series of studs for detachably securing said jaws on the body of said coupling member by which they are carried, said jaws having apertures therein adapted to be engaged by said studs, the other of said coupling members having a plurality of jaws adapted to intermesh loosely with said first named jaws, and a plurality of power transmitting members each interposed between two of said jaws carried by opposite coupling members, said last named coupling member having apertures therethrough each adapted to align with one of said apertures in said jaws to permit said studs after being withdrawn from said first named coupling member to be inserted through said last named apertures into engagement with said first named jaws to hold said jaws disengaged from said first named coupling member.

2. The combination of a coupling for connecting two substantially aligned shafts, of a pair of coupling members each adapted to be secured on a separate one of said shafts, each of said coupling members having a plurality of jaws adapted to intermesh loosely with the jaws carried by the other coupling member, a plurality of power transmitting members each interposed between two of said jaws carried by opposite coupling members, and means for detachably securing the jaws of one coupling member to the body of either coupling member.

3. The combination in a coupling for connecting two substantially aligned shafts, of a pair of coupling members each adapted to be secured upon a separate one of said shafts, each of said coupling members having a plurality of jaws arranged to intermesh loosely with the jaws carried by the other coupling member, a plurality of power transmitting members each interposed between two jaws carried by opposite coupling members, one of said coupling members having a longitudinally extending hub portion located within the jaws carried by that coupling member and having its outer surface spaced inwardly from said jaws, said hub portion being provided on its outer side with an annular rib located within the jaws carried by the other coupling member and spaced slightly therefrom.

4. The combination in a coupling for connecting two substantially aligned shafts, of a pair of coupling members each adapted to be secured upon a separate one of said shafts, each of said coupling members having a plurality of jaws arranged to intermesh loosely with the jaws carried by the other coupling member, a plurality of power transmitting members each interposed between two jaws carried by opposite coupling members, one of said coupling members having an annular part located within its jaws to prevent radial inward displacement of said power transmitting members, said annular part being located radially inward from portions of the other coupling member to limit the relative lateral dsplacement of the coupling members and to provide a bearing about which one coupling member may rock upon the other during their rotation.

5. The combination in a coupling for connecting two substantially aligned shafts, of a pair of coupling members each adapted to be secured on a separate one of said shafts, each of said coupling members having a plurality of jaws adapted to intermesh loosely with the jaws carried by the other coupling member, a plurality of power transmitting members each interposed between two of said jaws carried by opposite coupling members, and means for detachably securing the jaws of one coupling member on the body of that coupling member, said last named jaws being movable longitudinally of said body when detached therefrom, leaving a clearance between said jaws and said body and between said body and the jaws carried by the other coupling member, whereby said coupling body may have relative movement transversely of said shafts with respect to said other coupling member and all of said jaws.

6. The combination in a coupling for connecting two substantially aligned shafts, of a pair of coupling members each adapted to be secured on a separate one of said shafts, each of said coupling members having a plurality of jaws adapted to intermesh loosely with the jaws carried by the other coupling member, a plurality of power transmitting members each interposed between two of said jaws carried by opposite coupling members, one of said coupling members comprising a ring carrying the jaws of that coupling member, and means for detachably securing said ring to the body of that coupling member, said ring and the jaws carried thereby being movable longitudinally of said body when detached therefrom, leaving a clearance between said ring and said body and between said body and the jaws carried by the other coupling member, whereby said coupling body may have relative movement transversely of said shafts with respect to said other coupling member and all of said jaws.

LOUIS RICEFIELD.